June 9, 1953

L. L. GOOSMAN 2,641,232

HEATING UNIT

Filed June 12, 1950

INVENTOR.
LESLIE L. GOOSMAN
BY
Charles R. Werner
ATTORNEY

INVENTOR.
LESLIE L. GOOSMAN
BY
Charles R Werner
ATTORNEY

June 9, 1953  L. L. GOOSMAN  2,641,232
HEATING UNIT

Filed June 12, 1950  4 Sheets-Sheet 3

INVENTOR.
LESLIE L. GOOSMAN
BY
Charles R. Werner
ATTORNEY

Patented June 9, 1953

2,641,232

UNITED STATES PATENT OFFICE 2,641,232

HEATING UNIT

Leslie L. Goosman, Pagosa Springs, Colo.

Application June 12, 1950, Serial No. 167,691

3 Claims. (Cl. 122—18)

This invention relates in general to heating devices and primarily to a gas-fired unit for heating hot water for space heating, and for hot water supply to various fixtures in a house.

In the majority of present day homes, separate units are employed for heating the home and for heating the hot water used therein. Hot water radiant heat is becoming more popular and my invention is particularly adaptable for this type of heating.

The objects of my invention are, first; to provide a heating unit in which water is heated for kitchen, bathroom and laundry use, and from which hot water is also circulated for heating purposes.

Second; to provide in a heating unit of the class described, a combustion chamber, a heating tank in the combustion chamber, a burner below the heating tank, the products of combustion passing around the water heating tank and discharging from the combustion chamber at a point adjacent the top thereof.

Third; to provide in a heating unit of the class described, a water heating tank, water heating conduits leading from the tank and positioned externally thereof and in heating relation to a gas-fired burner below the water heating tank.

Fourth; to provide in a heating unit of the class described, a water heating unit, a hot water circulatory heating system, and a pump circulating the water through the system.

Fifth; to provide in a heating device of the class described, a water heating unit employing a novel arrangement of conduits in heating relation to a gas-fired burner for rapid heating and circulation of hot water in the water storage tank of the heating unit.

Sixth; to provide in a heating device of the class described, a water heating unit including a heating tank, conduits connected to and externally positioned on the tank and in which water is heated by a burner, a cold water supply inlet adjacent the bottom of the tank, a conduit connected to the tank adjacent the top thereof for supplying hot water to a radiant heating system, a return conduit from the radiant heating system leading to a motor driven pump for pumping the cooled return liquid into the tank adjacent the bottom thereof, and a hot water supply outlet at the top of the tank for use in the home.

Other objects and advantages as well as the construction and operation of my invention will be better understood by reference to the following description in connection with the accompanying drawings in which.

Figure 4:
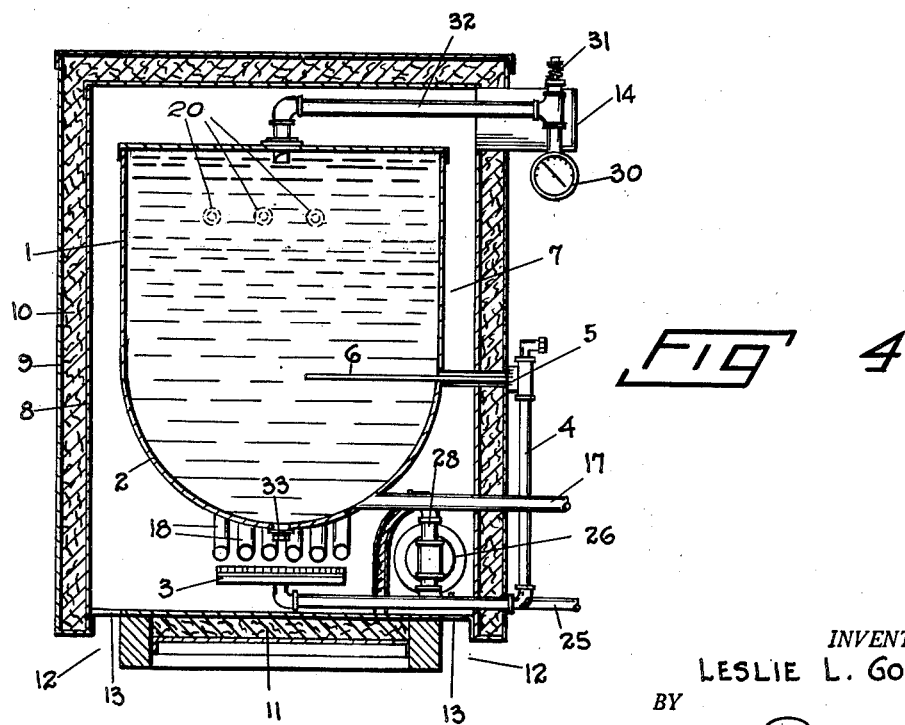
Fig. 4 is a transverse cross sectional view on the line 4—4 of Fig. 3.
Figure 5:
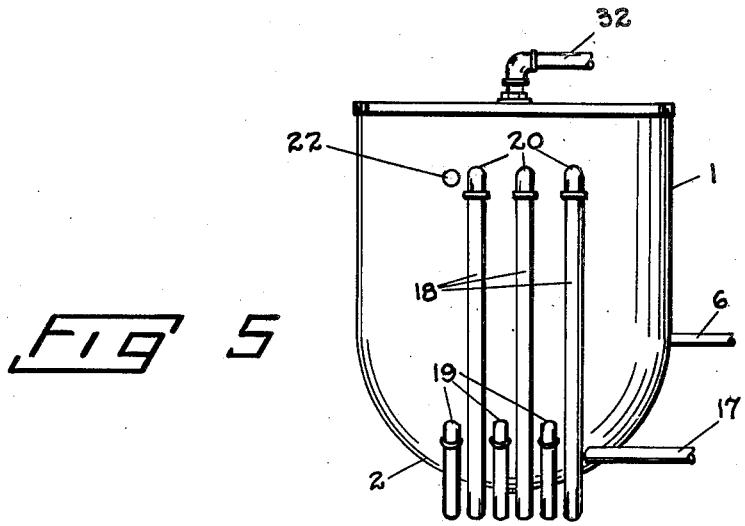
Fig. 5 is an end elevational view of the water heating tank with the external conduits.
Figure 6:
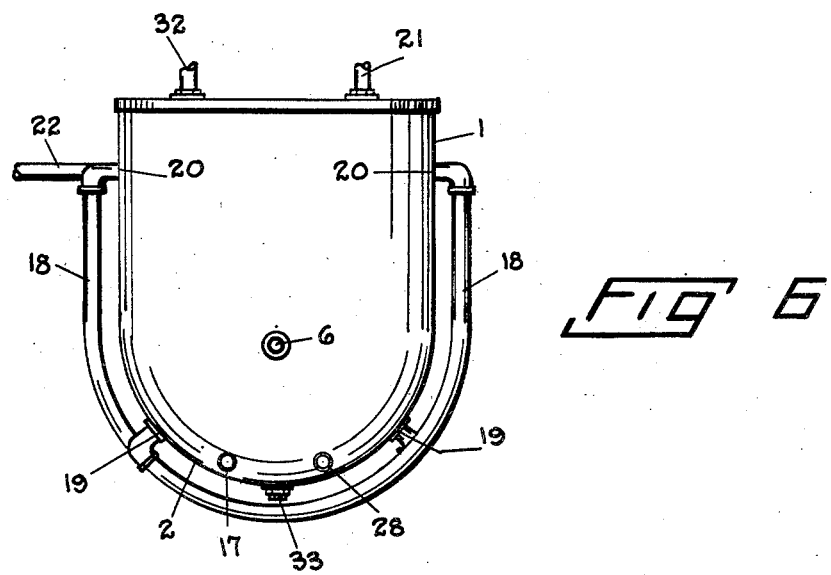
Fig. 6 is a side elevational view of the same.

Referring now to the drawings by numerals of reference, I designates a water heating tank preferably formed of a cast metal and having a semi-spheroidal bottom 2 under which is positioned a suitable burner 3 which may be supplied with gas, oil or other fuel through conduit 4 (Fig. 4). A thermostat control 5 in the fuel line or conduit 4 with element 6 positioned in the water tank I controls the flow of fuel and the burner operation according to the thermal needs of the system (Figs. 4, 5 and 6).

Figure 1:
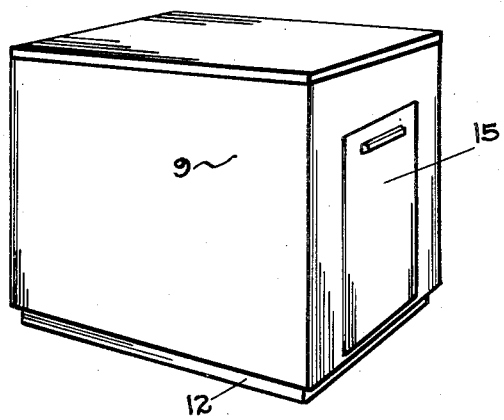
Fig. 1 is an isometric view of the assembled heating unit.
Figure 2:
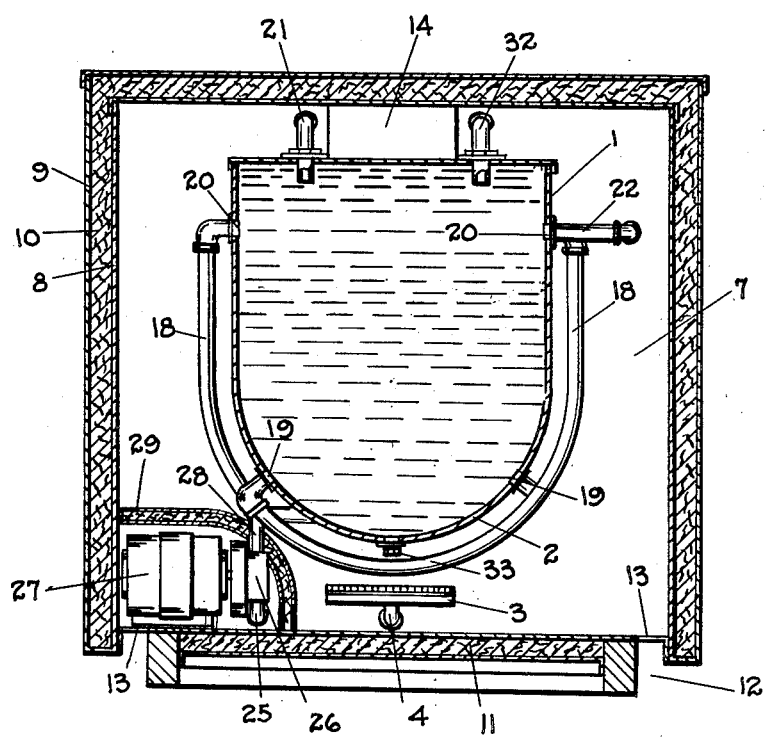
Fig. 2 is a longitudinal cross-sectional view through the heating device on line 2—2 of Fig. 3.

Spaced from the water tank I and providing a combustion chamber 7 is a casing formed of a fire wall 8 and an outer shell 9 with suitable insulation 10 such as fibre glass or the like therebetween (Figs. 2 and 4). The base 11 which is offset to provide toe kick space 12 is located below the burner 3 and air passages 13 are provided for supplying the necessary air to the burners for combustion (Fig. 4).

Figure 3:
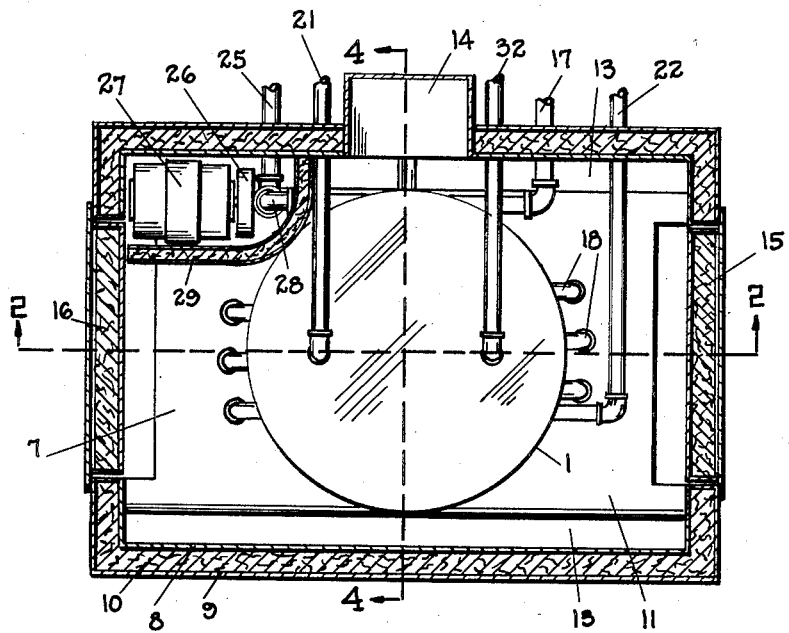
Fig. 3 is a top plan view of the internal elements of my heating device with the outer shell shown in cross section.

A flue outlet 14 at the top of chamber 7 provides for discharge of gases and other products of combustion. Suitable access doors to the combustion chamber may be provided in the casing. The access doors 15 and 16 may be suitably insulated in a manner similar to the casing itself (Fig. 3).

A cold water supply conduit 17 feeds water under normal water main pressure into the lower end 2 of the tank I which is kept full at all times. A plurality of water heating conduits 18 extend from inlets 19 at a level somewhat above the lowest point of the tank, around the curved bottom 2 to outlets 20 at a level adjacent the top of the tank. Cooler water gravitating into the conduits 18 is heated therein by the burner 3 and forced upwardly to discharge from outlets 20, this action continuing until the desired water temperature is reached and the thermostat cuts off the burner fuel supply.

The heated water in the tank is used for two purposes, namely; as a hot water supply in the kitchen, bath and laundry, and as a hot water supply in a heating system for the various rooms in the house.

A hot water supply conduit 21 leads from the upper end of the tank 1 to the various units which are to be supplied with hot water.

Figure 7:
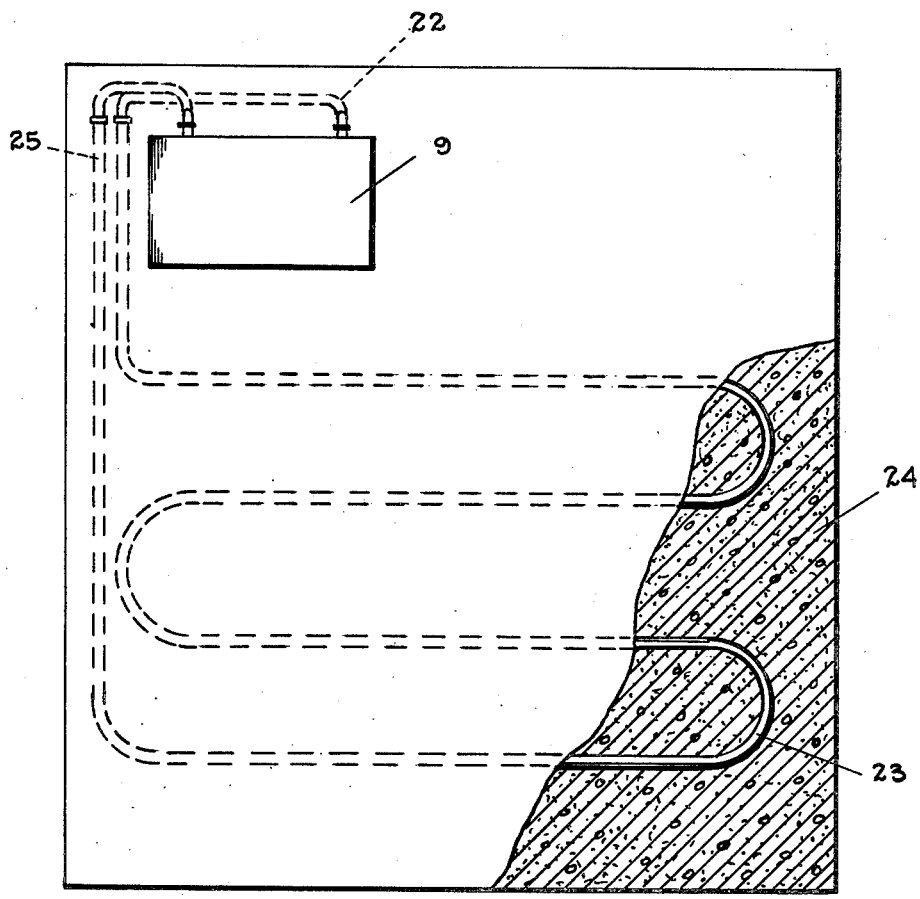
Fig. 7 is a schematic view of a radiant hot water heating system employing one of my heating units.

Hot water for the room heating system is discharged from the tank 1 through conduit 22 preferably at the same level as outlets 20 from the water heating conduits 18 (Figs. 2, 3, 5 and 6). Although this water can be used in standard radiators or other room heating units, I have shown a hot water heating system in which conduit 23 is embedded in a concrete floor 24 with a return conduit 25 directing the water back to the heating tank 1. This is what is commonly known in the trade as a radiant heating system (Fig. 7).

The return water supply conduit 25 terminates in a suction pump 26 driven by motor 27, the pump forcing the return water through conduit 28 into the lower end of tank 1 for reheating and recirculation. A suitable insulated partition 29 protects the pump and motor from the heat of the burner (Figs. 2 and 4).

For proper regulation of the heating device a pressure gauge 30 and safety popoff valve 31 are carried by conduit 32 which enters the tank 1 at the top thereof. A drain nut 33 is provided in the bottom of the tank 1 for facilitating removal of the water and any sediment accumulating in the tank, when such cleaning procedure is deemed necessary (Fig. 4).

In operation, with the water supply line 17 connected to a suitable water source under pressure to maintain a full tank of water, conduits 22 and 25 connected to the room heating system, hot water line 21 connected to the fixtures to be served with hot water, and a fuel supply line 4 connected to the burner, said burner is lighted and the water in the tank and in conduits 18 will be heated and will move to the top of the water tank 1. Heat from the burner will fill the combustion chamber 7 and assist in maintaining the temperature of the water elevated, the cast metal construction of the tank also aiding in this respect. Good distribution of hot water within the tank 1 is obtained by the alternate disposition of conduits 18.

A continuous hot water supply is maintained at a constant temperature by thermostat 5. Water can be continuously circulated in conduits 22, 23 and 25 by motor driven pump 26 for heating of the home or any other space. Action of the burner can be controlled from a remote thermostat in any room, starting and stopping the action of the burner when the temperature of the room reaches a predetermined minimum or maximum. The motor driving the pump can be thermostatically controlled for desired circulation of hot water. It will be noted that the pump draws water from conduit 23 and forces it into the tank 1 for reheating.

Hot water for kitchen, bathroom and laundry fixtures flows automatically and continuously from conduit 21 upon opening of any hot water faucet.

From the foregoing it will be apparent that I have provided a compact and effective combination hot water heating system which will automatically provide continuous hot water for washing and heating purposes, which will be economical to operate and which will be relatively inexpensive to construct in comparison to present day heaters of comparable efficiency. The need for separate furnace and hot water heater is eliminated.

Obviously, changes in form, proportion and details of construction may be resorted to without departing from the spirit of my invention and I reserve all rights to such changes as come within the scope of these specifications and the claims which follow.

What I claim as new and desire to secure by Letters Patent is:

1. A heating device comprising a combustion chamber, a heating tank completely enclosed in the combustion chamber, said tank having a substantially semi-spheroidal shaped bottom, a conduit from the tank to a source of water, water heating conduits externally of and spaced from said tank and extending arcuately across the bottom of the tank from the lower end at one side thereof to the upper portion of said tank on the other side thereof in close proximity thereto, and a burner below the heating tank and the conduits.

2. A heating device comprising a combustion chamber, a heating tank completely enclosed in the combustion chamber, said tank having a substantially semi-spheroidal shaped bottom, a conduit from the tank to a source of water, water heating conduits located externally of and in close proximity to said tank and extending transversely from the lower end of the tank at one side thereof arcuately across the bottom and in substantially parallel relation to the tank, to the upper portion of said tank on the other side thereof, and a burner below the heating tank and the conduits.

3. A heating device comprising a combustion chamber, a heating tank completely enclosed in the combustion chamber, said tank having a substantially semi-spheroidal shaped bottom, a conduit from the tank to a source of water, water heating conduits externally of said tank, adjacent of said conduits extending from the lower end of the tank at alternate opposite sides thereof to the upper portion of said tank on opposite sides thereof, and a burner below the heating tank and the conduits.

LESLIE L. GOOSMAN.

References Cited in the file of this patent

UNITED STATES PATENTS

| Number | Name | Date |
| --- | --- | --- |
| Re. 17,021 | Weir | July 3, 1928 |
| 70,690 | Bringier | Nov. 12, 1867 |
| 526,733 | Paul | Oct. 2, 1894 |
| 708,729 | Penman | Sept. 9, 1902 |
| 785,189 | Taylor | Mar. 21, 1905 |
| 820,013 | Rider | May 8, 1906 |
| 1,164,803 | Freymark | Dec. 21, 1915 |
| 1,568,788 | Williams | Jan. 5, 1926 |
| 1,672,252 | Garvey | June 5, 1928 |
| 1,776,984 | Sinton et al. | Sept. 30, 1930 |
| 1,794,953 | Gage | Mar. 3, 1931 |
| 2,069,693 | Barrett | Feb. 2, 1937 |
| 2,187,850 | Byrum | Jan. 23, 1940 |
| 2,291,228 | Jensen | July 28, 1942 |
| 2,504,092 | Thomas | Nov. 30, 1945 |

FOREIGN PATENTS

| Number | Country | Date |
| --- | --- | --- |
| 503,383 | Great Britain | Apr. 5, 1939 |